July 23, 1957 A. WAGNER 2,800,063
FLASH SYNCHRONIZING DEVICE FOR CAMERA SLIT-TYPE SHUTTERS
Filed Aug. 29, 1956 4 Sheets-Sheet 1
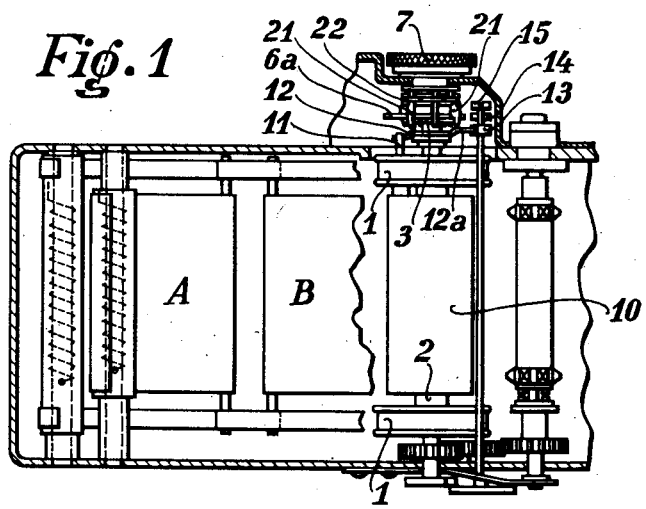
Fig. 1
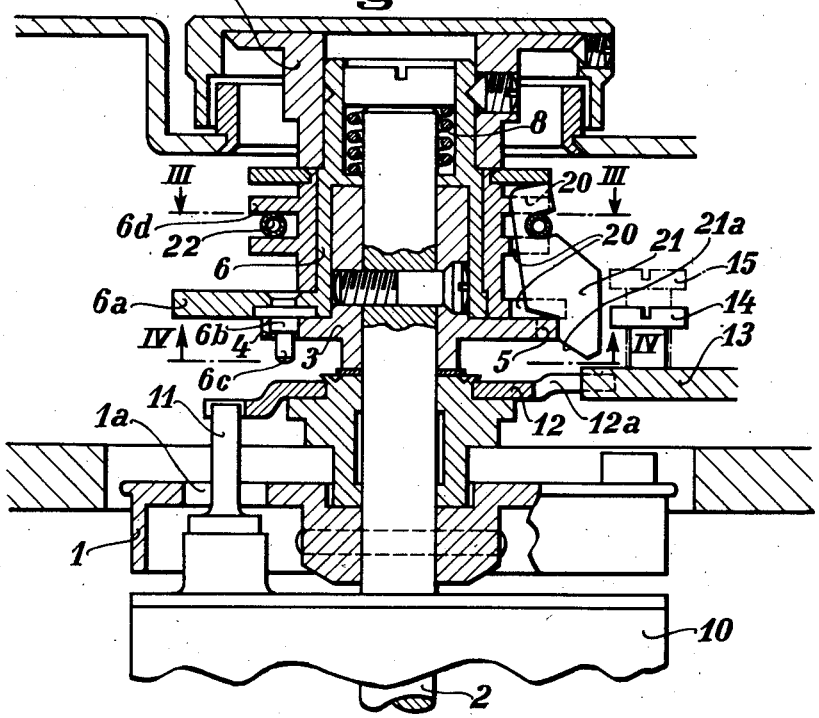
Fig. 2 II-II
INVENTOR.
Adam Wagner
BY
Klein & Hart
his attorneys.

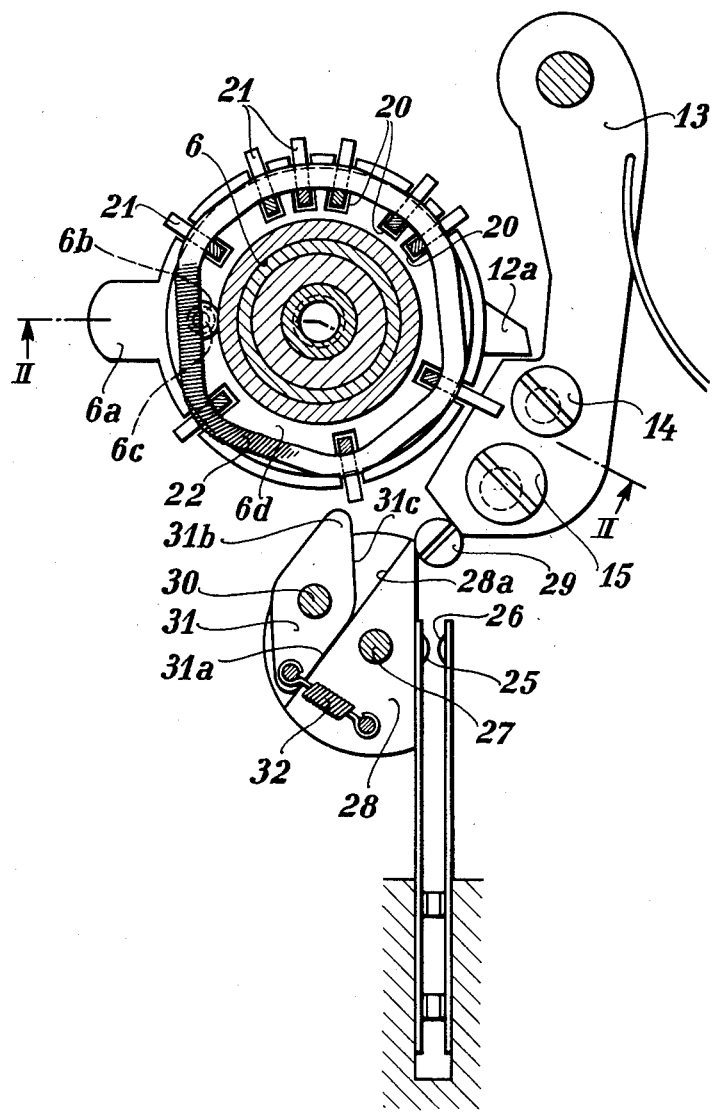

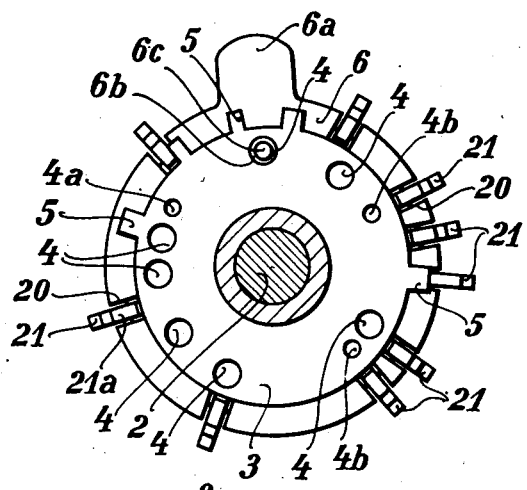
Fig. 4 IV-IV
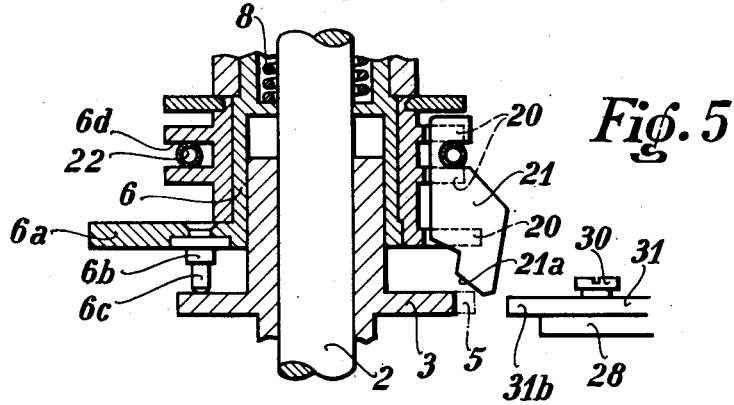
Fig. 5
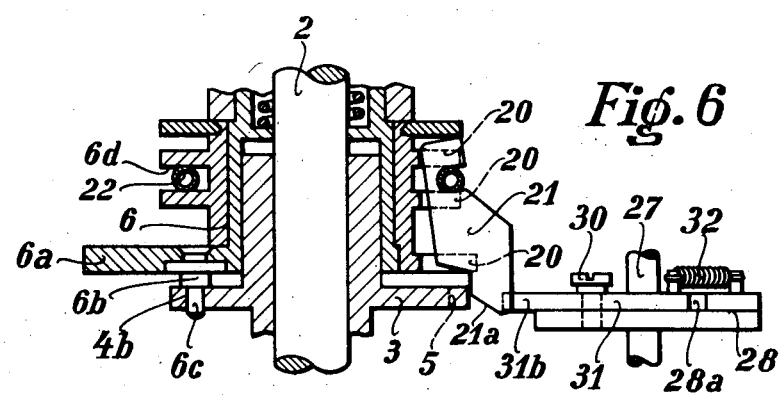
Fig. 6

July 23, 1957   A. WAGNER   2,800,063
FLASH SYNCHRONIZING DEVICE FOR CAMERA SLIT-TYPE SHUTTERS
Filed Aug. 29, 1956   4 Sheets-Sheet 4
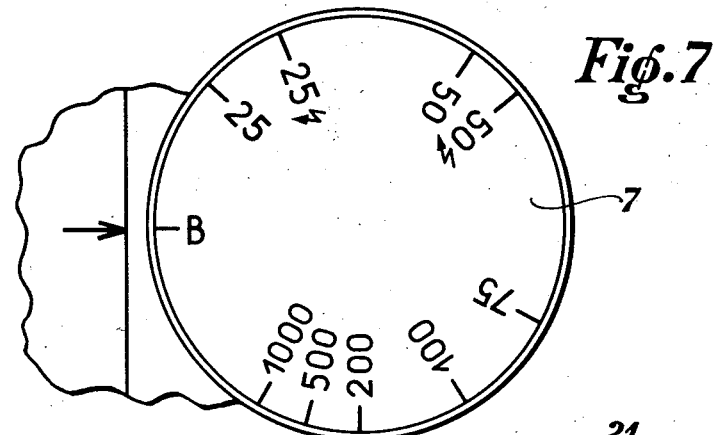
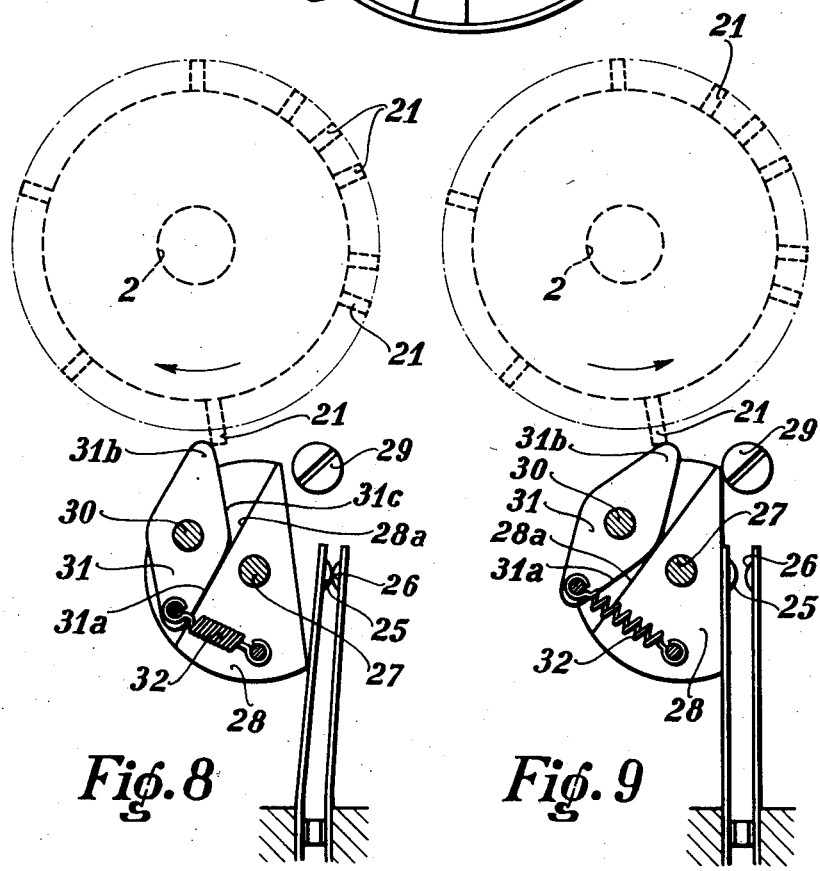

United States Patent Office 2,800,063
Patented July 23, 1957

2,800,063

FLASH SYNCHRONIZING DEVICE FOR CAMERA SLIT-TYPE SHUTTERS

Adam Wagner, Wetzlar (Lahn), Germany, assignor to Ernst Leitz A.-G., Optische Werke, Wetzlar, Germany, a corporation of Germany Application August 29, 1956, Serial No. 606,827

Claims priority, application Germany September 15, 1955

5 Claims. (Cl. 95—11.5)

The present invention relates to a flash-synchronizing device for photographic slit-type (focal-plane) or roller-blind instantaneous shutters with consecutively releasable and operating curtains or roller-blinds.

In such flash-synchronizing devices it is known to actuate the flash-triggering switch with a cam operatively connected to the first released curtain. This cam can either be connected to the operating member regulating the release of the second curtain or it can be adjusted to the exposure-setting disc connected therewith, according to whether the camera has a built-in or subseqently attached synchronizing device. The exposure-setting knob, or the operating member connected therewtih, in this type of focal plane shutter may be set for the second curtain on varying operating planes and on operating paths of varying lengths in connection with stops of the extendable locking member cooperating therewith by means of an engaging disc operated by the first curtain. The adjustability of the operating member on varying operating planes and the corresponding arrangement of stops on different planes on the locking member for the second curtain has heretofore had the purpose of making the stop settings lying very close to one another in the short exposure times mechanically more manipulatable and adjustable and of achieving a certain adjustable braking action to equalize the curtain velocities. In addition, with a slit shutter camera constructed in this manner, in order to adapt the flash triggering to the different types of flash, it was necessary either to make the actuating cam for the flash-triggering switch adjustable to its carrying means or to arrange the flash-triggering switch adjustably in relation to the actuating cam. These synchronizing devices, although they are very sensitively adaptable to varying shutter speeds and to the varying behaviour of different types of flash, have the disadvantage of requiring several manipulations and in certain cases the use of tables.

In accordance with the present invention, an improvement of this kind of synchronizing device and a simplification of its operation is achieved by connecting a plurality of extendable and retractable switch cams or trigger cams, correlated to the adjustable exposure times or exposure time groups, to the operating member and by giving the engaging disc a corresponding number of regulating cams, these regulating cams effecting placing of one of the switch cams into the operating position for the actuation of the flash-triggering contact upon release of the shutter and depending on the exposure time setting. Thus, with a flash synchronizing arrangement constructed in this manner, it is only necessary to set the exposure time to effect the correct switch cam setting automatically.

According to the preferred embodiment of the invention, the switch cams are positioned like spokes in radial slots of a support member supporting the operating member and are retained by an annular spring which simultaneously acts as a swivel axis. The regulating cams are likewise suitably constructed as spoke-like projections of the engaging disc.

Since, in this type of slit shutter, the exposure time setting members are revolved upon cocking of the shutter as well as upon its release, the cooperation of the switch cams with the contact arm of the flash-triggering switch is, furthermore, effected through a unidirectionally operating lever (a so-called drop trap) which permits actuation of the flash-triggering switch only in one direction of movement of the switch cam (the operating direction). Thus the installation of a special safety switch (pre-contact) becomes unnecessary.

It is a characteristic of the slit shutters that certain types of flash (electron flash, central shutter flash), due to their short duration of flash, can only be used with certain exposure times in which the slit exposes the whole film frame. On the other hand, however, at these exposure times the so-called slit shutter flashes of longer duration may also be used. These two types of flash require different flash timing if their characteristic lighting power is to be correctly exploited. For certain exposure times it is therefore necessary to have a switch cam for an early flash triggering occurring upon or immediately after release of the shutter (slit shutter flash) as well as a switch cam for a later flash triggering occurring toward the end of the open phase of the shutter (electron flash, central shutter flash). In accordance with the present invention, this is achieved by employing the means, known per se, of regulating the exposure times on different operating planes of the operating member for regulating the switch cams, and furthermore, at certain exposure times for each of these certain exposure times two different engaging positions of the operating member are provided for the operation of the operating member on different planes, wherein in one engaging position a switch cam for the later flash-triggering action is put into operating position. It is, therefore, appropriate to mark only the exposure time markings associated with the later flash-triggering (electron flash, central shutter flash), with corresponding symbols.

Further details of the invention and its method of operation will be more fully described in connection with a preferred embodiment illustrated in the accompanying drawing, in which—

Fig. 1 shows a schematic front view of a photographic slit shutter constructed according to the present invention;

Fig. 2 shows an enlarged section of the exposure-setting device with the switch cams, taken along line II—II of Fig. 3;

Fig. 3 shows a top view of the exposure setting device with flash-triggering switch in section along line III—III of Fig. 2;

Fig. 4 shows a bottom view of the exposure setting device in section along line IV—IV of Fig. 2;

Fig. 5 shows a partial representation of the exposure setting device according to Fig. 2 in an intermediate position during transition from one exposure time to another;

Fig. 6 shows a partial representation of the exposure setting device according to Fig. 2 but with the operating member set on another operating plane;

Fig. 7 shows a top view of the shutter-speed-setting knob with exposure markings;

Figs. 8 and 9 show a switch cam and the flash-triggering switch according to Fig. 3 in the triggering position (upon release of the shutter) and in the returning position (upon cocking of the shutter), respectively. In order to clarify the position of the switch cam in the operating position, the circuit of the switch cams in non-operating position has been indicated.

Referring more specifically to Figs. 1, 2, and 4, drums 1, 1 of the first-operating curtain A are rigidly connected by shaft 2 with engaging disc 3 so that the latter takes part in the operating movement of curtain A. Engaging disc 3 is provided with engaging holes 4, 4a, 4b of varying diameters. In addition, engaging disc 3 carries radially arranged regulating cams 5. Mounted above engaging disc 3 and rotatable about its axis 2 is support member 6 for operating member 6a. Member 6 is rigidly connected to exposure-setting knob 7 and, together therewith against the action of spring 8 in the direction of axis 2, is axially adjustable in relation to engaging disc 3. Operating member 6a is provided with engaging pin 6b, 6c, constructed of two sections of different diameter, which pin cooperates with engaging holes 4, 4a, 4b of engaging disc 3, and, depending on the engaging hole used, holds the operating member 6a at different levels in relation to engaging disc 3 and couples it with the latter. Engaging holes 4 together with engaging pin section 6b serve for the setting 1/1000 s., and the engaging holes 4b together with engaging pin section 6c for the settings specially marked on the exposure setting knob 7 for 1/25 $<$ s. and 1/50 $<$ s. It is understood, of course, that other exposure settings and divisions are also possible.

Drum 10 for the second curtain B (Fig. 1) is freely rotatable about shaft 2. Blocking disc 12 for the second curtain B is likewise freely rotatable about shaft 2, and drum 10 is operatively connected thereto by coupling pin 11 (Fig. 2) projecting through circular slot 1a of the upper tape drum, whereby blocking projection 12a of blocking disc 12 cooperates with extendable blocking member 13 (Fig. 3). Blocking member 13 is provided with two stops 14, 15 of differing lengths. Stops 14, 15 in the blocking position of the second curtain B project into the operating path of operating member 6a which is moved by the first-released curtain A. Upon contact of operating member 6a in operation against one of the stops 14, 15, blocking member 13 is deviated and thus the blocking of the second curtain released so that the latter can follow the first curtain. Stop 14 of blocking member 13 cooperates with operating member 6a at all exposure time settings in which engaging pin 6b engages engaging holes 4 with the large diameter. If the engaging pin section 6c of smaller diameter engages an engaging hole 4a or 4b of correspondingly smaller diameter, the operating member runs off on a different level and cooperates with stop 15 of blocking member 13. This regulation of shutter speeds on different operating planes of operating member 6a serves to render more controllable the setting and operating positions of the mechanically cooperating parts, which positions are very close to one another particularly at the short exposure times, and it also serves to produce a certain braking action upon release of the first curtain.

In accordance with Figs. 2, 3, and 4, support member 6 of operating member 6a is provided with switch cams 21 positioned like spokes in radial slots 20, which cams are retained in said slots by annular spring 22 in connection with annular groove 6d of support member 6. Annular spring 22 simultaneously serves as swivel axis for switch cams 21. The arrangement of switch cams 21 assigned to operating member 6a and of regulating cams 5 assigned to engaging holes 4, 4a, 4b of engaging disc 3 has been so chosen, that at any one time upon the engagement of engaging pin 6b, 6c into an engaging hole, a specific switch cam 21 is radially displaced.

Flash-triggering contact 25, 26 for the flash-triggering circuit of the synchronizing device is positioned at a suitable place of the shutter body in the vinicity of the exposure setting device for the slit shutter (Figs. 3, 8, and 9). Spring contact arm 25 is biassed by a unidirectionally operating lever (so-called drop trap). The lever consists of a lever disc 28 pivotable about a stationary axle 27, which disc is held in contact with stationary stop 29 by the spring action of contact arm 25. Auxiliary lever 31 is pivotally mounted about pivot 30 on lever disc 28 and spring 32 holds lever 31 with its contact surface 31a in contact with corresponding opposing surface 28a of lever disc 28. The arrangement has been so devised that the lever projection 31b of the auxiliary lever 31, when contact surfaces 31a and 28a are in contact position, projects into the operating path of a switch cam 21 radially displaced by a regulating cam 5.

The flash synchronizing device of the invention operates as follows:

As may be seen in Figs. 2 and 3, upon engagement of engaging pin 6b into a larger engaging hole 4 of engaging disc 3, one of the plates 21 has been radially outwardly displaced by one of the regulating cams 5. If a different exposure setting is now selected, exposure setting knob 7 is first of all raised against the action of spring 8 so that engaging pin 6b, 6c is disengaged from engaging hole 4 (Fig. 5). The switch cams 21 take part in this axial displacement of exposure setting knob 7 with support member 6 and operating member 6a, whereby the switch cam 21 previously radially displaced, moves out of the operating connection with its regulating cam 5 of engaging disc 3 and is once more radially inwardly displaced by the action of annular ring 22. In this raised position of exposure setting knob 7 with member 6 and operating member 6a all switch cams 21 are outside of the active range of projection 31b of the auxiliary lever 31 mounted on lever disc 28.

By turning exposure setting knob 7 about shaft 2, engaging pin 6b, 6c of operating member 6a is brought into a position corresponding with another engaging hole, e. g. pin section 6c in correspondence with an engaging hole 4b. Since this engaging hole 4b, because of its smaller diameter, can only accept the thinner section 6c of the engaging pin, the thicker section 6b of the engaging pin comes to rest upon engaging disc 3 so that operating member 6a is maintained above engaging disc 3 at a height equal to that of the thicker pin section 6b (Fig. 6). Upon engaging, the inclined surface 21a of switch cam 21 is brought against a regulating cam 5 of the engaging disc 3 assigned to engaging hole 4b, and switch cam 21 is forced outward by pivoting about the axis formed by annular spring 22. It thus once again comes into the active range of lever projection 31b of auxiliary lever 31 connected with lever disc 28 with which it cooperates upon operation of the shutter.

If the first curtain A is set in motion by actuation of the shutter release, operating member 6a with switch cams 21 takes part in its movement while the second curtain B is retained for the time being by blocking member 13 and blocking projection 12a (Fig. 3). According to the exposure time set, the radially displaced regulating cam 21 comes to act upon lever projection 31b of auxiliary lever 31 at an earlier or later point of time and through the latter and the contact surfaces 31a and 28a pivots the lever disc 28 about its pivot 27 whereby this disc 28 brings spring contact arm 25 into contact with contact arm 26 (Fig. 8). Thus, the flash-triggering contacts are closed and the flash is triggered. After switch cam 21 in operation has passed lever projection 31b, lever disc 28 with auxiliary lever 31 is returned to the original position by the action of spring contact arm 25, so that contact with stop 29 is restored. The contact connection 25, 26 is thus broken once more.

During the operating movement of switch cam 21 in operating position, operating member 6a has come to act upon one of the stops 14, 15 of blocking member 13 at an earlier or later point of time, according to the distance it has been set above engaging disc 3, and displace this blocking member 13 so far that blocking projection 12a is released and thus the second curtain brought into operation.

If after completed operation the shutter is again cocked, switch cam 21 in operating position again comes to act upon lever projection 31b in reversed direction of movement. Due to stationary stop 29, however, lever disc 28 is prevented from yielding to this action of switch cam 21. Instead, auxiliary lever 31 is pivoted about its axis 30 whereby spring 32 is simultaneously flexed (Fig. 9). Contact 25, 26, however, remains broken. After switch cam 21 in operating position has passed lever projection 31b, auxiliary lever 31 jumps back under the action of auxiliary spring 32 so that contact surface 31a is again brought to rest against contact surface 28a. The flash-triggering device is then again in operating position for a renewed shutter operation.

The different flash-triggering times required at certain exposure times are attained by assigning these exposure times, for instance, 1/25 and 1/50 s., special engaging holes 4b of engaging disc 3 in addition to their engaging holes 4 and special time markings on the exposure time setting knob (Figs. 4 and 7). These times provided for the closing of the flash-triggering contact toward the end of the open phase of the shutter are suitably marked on the exposure time setting knob with a symbol, for instance, a lightning symbol (Fig. 7). The engaging holes and time markings are arranged according to the distance between stops 14, 15 on blocking member 13 (Figs. 3, 4, and 7) whereby the exposure time settings marked with the special symbol cooperate with stop 15 of blocking member 13 upon operation of the shutter. Switch cams 21 and regulating cams 5 are assigned to these exposure time settings in such a manner that actuation of the trigger occurs only after a longer section of the operating cycle has elapsed than at settings for the same exposure time values not marked by special symbols.

In accordance with the invention, an associated switch cam 5 can now be provided for each individual exposure time. It is, however, also possible to assign only one switch 5, correspondingly dimensioned as the case may be, to a plurality of exposure time settings.

While the invention has been described in detail in connection with one preferred embodiment, it will be understood that many changes and modifications may occur to the skilled in the art, particularly after benefiting from the present teaching, without departing from the spirit and scope of the invention as defined in the appended claims.

I claim:

1. A flash synchronizing device for camera slit-type shutters with consecutively releasable and consecutively operating curtains, comprising a flash-triggering switching means, a cam operatively connected to the first-released curtain and arranged to actuate the switching means; an operating member arranged to release the second curtain; means for adjusting the operating member, said means including an engaging disc arranged to be moved by operation of the first-operating curtain to adjust the operating member on different operating planes and over operating paths of different lengths in relation to and engagable by stops of an extendable blocking member for the second curtain; and a plurality of extendable and retractable switch cams corresponding to settable exposure times connected with the operating member, said engaging disc having a corresponding number of regulating cams for placing one of said switch cams into operating position for actuation of the flash-triggering switching means upon operation of the shutter depending upon the exposure time set.

2. The device of claim 1, comprising a support member for the operating member, the switch cams being arranged in radial slots of said support member, and an annular spring for retaining the switch cams in the slots, which spring simultaneously forms a swivel axis.

3. The device of claim 1, wherein said regulating cams are spoke-like projections of said engaging disc.

4. The device of claim 1, wherein said flash-triggering switching means comprises a contact arm, a unidirectional operating lever means being arranged to cooperate between said switch cams and said contact arm, actuation of the flash-triggering switching means being effected only in one direction of movement of the switch cams.

5. The device of claim 1, wherein the operating member has an engaging pin with a plurality of sections of different diameters and said engaging disc has engaging holes of correspondingly different diameters, and wherein, for certain exposure times of a specific exposure time, two engaging holes of different size and postioned adjacent to one another in the direction of turn and arranged to bring said operating member onto different operating planes and regulating cams so that, in one engaging position, a switch cam is brought into operating position for an earlier flash-triggering action and in the other engaging position a switch cam is brought into operating position for a later flash-triggering action.

No references cited.